United States Patent [19]
Ishihara

[11] Patent Number: 6,167,288
[45] Date of Patent: Dec. 26, 2000

[54] FOLDED-TYPE PORTABLE TELEPHONE SET

[75] Inventor: Junji Ishihara, Saitama, Japan

[73] Assignee: NEC Corporation, Tokyo, Japan

[21] Appl. No.: 09/102,606

[22] Filed: Jun. 23, 1998

[30] Foreign Application Priority Data

Jun. 26, 1997 [JP] Japan ................................ 9-170391

[51] Int. Cl.⁷ .................................................. H04Q 7/20
[52] U.S. Cl. ......................... 455/566; 455/421; 455/90; 455/575; 455/422
[58] Field of Search .................... 455/421, 38.4, 455/566, 90, 575, 422; 379/430, 431, 432, 433

[56] References Cited

U.S. PATENT DOCUMENTS

| | | | |
|---|---|---|---|
| 5,644,620 | 7/1997 | Shimura | 455/421 |
| 5,706,332 | 1/1998 | Nagai | 455/90 |
| 5,809,414 | 7/1998 | Coverdale et al. | 455/421 |
| 5,832,386 | 11/1998 | Nojima et al. | 455/465 |
| 5,867,782 | 2/1999 | Yoon | 455/421 |
| 5,956,656 | 9/1999 | Yamazaki | 455/575 |
| 5,966,656 | 10/1999 | Elkin et al. | 455/421 |
| 5,966,671 | 10/1999 | Mitchelle et al. | 455/575 |
| 5,991,644 | 11/1999 | Ogawa | 455/566 |

FOREIGN PATENT DOCUMENTS 8-163638  6/1996  Japan .

*Primary Examiner*—Daniel S. Hunter
*Assistant Examiner*—Yemane Woldetatios
*Attorney, Agent, or Firm*—McGinn & Gibb, P.C.

[57] ABSTRACT

A control circuit 7 investigates, based on inputs from an opening/closing condition detecting circuit 3 and a display button switch 1, a radio wave receiving condition when the display button switch 1 is operated while first and second main bodies 8 and 9 are closed, instructs, if although out of bounds is displayed when the display button switch 1 is operated, the display is then changed to within bounds, a sounder 6 to issue an informing sound in order to inform a user of the change in condition and also instructs a display lamp 2 for displaying. The sounder 6 informs the user of the change in condition from out of bounds to within bounds and the display lamp 2 displays within bounds.

15 Claims, 3 Drawing Sheets

FOLDED-TYPE PORTABLE TELEPHONE SET

BACKGROUND OF THE INVENTION

The present invention relates to a folded type portable telephone set, and more particularly to a set for confirming the impossibility of communications because the portable telephone set is in "OUT OF BOUNDS" of a service area which enables communications and then automatically informing, if the portable telephone set moves from "OUT OF BOUNDS" to "WITHIN BOUNDS" of the service area which enables communications while a user moves carrying the portable telephone set in its folded state, the user of the entry to the area of "WITHIN BOUNDS" by an informing sound or vibration.

For example, as disclosed in JP-A-163638/1996, a conventional folded type portable telephone set is constructed in such a manner that even if the portable telephone set is carried in its folded state, by operating a button switch provided in the side face of a main body to actuate displaying means also provided in the side face and having WITHIN BOUNDS/OUT OF BOUNDS display functions, a user of the portable telephone set can be informed as to whether he is in WITHIN BOUNDS of a service area for communications or OUT OF BOUNDS for non-communications. Normally, if a radio wave from a base station cannot be received by an electric field strength of a fixed level or higher even if the user is in a service area, "OUT OF BOUNDS" is displayed. However, if "OUT OF BOUNDS" is displayed when the user of the folded type portable telephone set operates the button switch and actuates a display for displaying in order to make a call, then the user must move for a while and operate the button switch again to actuate the displaying means for displaying. Consequently, it was necessary for the user of such a folded type portable telephone set to repeat the foregoing operations until the display of "WITHIN BOUNDS" appeared. With the foregoing conventional folded type portable telephone set, when the user of the portable telephone set operates the button switch and actuates the displaying means to display "WITHIN BOUNDS" or "OUT OF BOUNDS" in order to make a call, If the display of "OUT OF BOUNDS" appears, the user must move for a while and operate the button switch again to instruct the displaying means to perform displaying. Thus, the conventional folded type portable telephone set is disadvantageous in that until the display of "WITHIN BOUNDS" appears, the user must move around and repeat the foregoing operations.

SUMMARY OF THE INVENTION

The objective of the present invention is to solve these problems mentioned above.

It is an object of the present invention to provide a folded type portable telephone set carried in a folded state, which can automatically inform, if out of bounds is displayed by displaying means at the time a call is made, when a user continues to move carrying the telephone set and enters an area of within bounds for communications, the user of the entry to the within bounds area.

The folded type portable telephone set of the present invention is constructed in such a manner that when a condition of out of bounds is displayed in a position to be seen while its main body is in a folded state is changed to a condition of within bounds, a user can be informed of the change in condition by informing sound or vibration.

The folded type portable telephone set of the present invention comprises opening/closing condition detecting means for detecting opening/closing conditions of first and second main bodies; the first main body having a display for displaying various bits of information visibly and the second main body having various function switches including a character/numeral input switch connected to the first main body so as to be opened/closed, displaying means for visibly displaying within bounds or out of bounds, and switching means for making effective the WITHIN BOUNDS/OUT OF BOUNDS display function of the displaying means when operated while the first and second main bodies are in closed states. With the folded type portable telephone set thus constructed, if a condition is out of bounds when the switching means is operated while the first and second main bodies are in closed states and then the condition is changed to within bounds, a user is informed of the change in condition by informing sound or vibration without seeing a display made by the displaying means.

The folded type portable telephone set of the present invention comprises opening/closing condition detecting means for detecting opening/closing conditions of first and second main bodies; the first main body having a display for displaying various bits of information visibly and the second main body having various function switches including a character/numeral input switch connected to the first main body so as to be opened/closed, displaying means for visibly displaying within bounds or out of bounds, switching means provided in a side face of the first main body for making effective the WITHIN BOUNDS/OUT OF BOUNDS display function of the displaying means when operated while the first and second main bodies are in closed states, and control means for controlling the display and the displaying means based on inputs from the various function switches, the opening/closing condition detecting means and the switching means. Informing means is provided for informing, if a condition is out of bounds when the switching means is operated while the first and second main bodies are in closed states and then the condition is changed to within bounds, a user of the change in condition by an informing sound or vibration. In the folded type portable telephone set thus constructed, the control means includes as control operation steps a flag initial value setting step of setting a WITHIN BOUNDS/OUT OF BOUNDS condition flag value to a value indicating within bounds as an initial value irrespective of which position, within bounds or out of bounds, the folded type portable telephone set actually takes; the condition flag value being used for indicating, immediately after power input, which position the folded type portable telephone set takes, within bounds or out of bounds, a flag condition determining step of determining which value, within bounds or out of bounds, the WITHIN BOUNDS/OUT OF BOUNDS condition flag value takes, an opening/closing condition and switching means operation condition determining step of making determination, based on a detecting result of the opening/closing condition detecting means if within bounds is determined in the flag condition determining step, as to whether the first and second main bodies are in closed states or not and as to whether the switching means provided in the first main body side face is in an operated state or not, and returning to an operation of the flag condition determining step if the first and second main bodies are not in closed states and alternatively if the switching means is not in an operated state, a first radio wave receiving condition determining step of investigating a radio wave receiving condition of the folded type portable telephone set so as to determine a condition of within bounds or out of bounds if a result of determination made in the opening/closing condition and switching means operation condition determining step shows that the first and second main bodies are in closed states and the switching means is in an operated state, a within bounds displaying step of displaying, if a condition of within bounds is determined in the first radio wave receiving condition determining step, the condition of within bounds and then returning to an operation of the flag condition determining step, an OUT OF BOUNDS displaying step of displaying, if a condition of out of bounds is determined in the first radio wave receiving condition determining step, the condition of out of bounds, an OUT OF BOUNDS flag setting step of changing, after the OUT OF BOUNDS displaying step, a value of the WITHIN BOUNDS/OUT OF BOUNDS condition flag to a value indicating out of bounds and returning to an operation of the flag condition determining step, a second radio wave receiving condition determining step of investigating a radio wave receiving condition of the folded type portable telephone set so as to determine a condition of within bounds or out of bounds if out of bounds is determined in the flag condition determining step and then returning to an operation of the flag condition determining step if a condition of out of bounds is determined, a WITHIN BOUNDS condition transfer information displaying step of instructing, if within bounds is determined in the second radio wave receiving condition determining step, the informing means to inform a user of a change in condition from out of bounds to within bounds and the displaying means to display the change in condition from out of bounds to within bounds, and a WITHIN BOUNDS flag setting step of changing, after the WITHIN BOUNDS condition transfer information displaying step, a value of the "WITHIN BOUNDS/OUT OF BOUNDS" to a value indicating within bounds and then returning to an operation of the flag condition determining step.

As described above, the folded type portable telephone set of the present invention comprises the informing means for informing, even if out of bounds is displayed on the displaying means when the switching means is operated while the telephone set is in a folded state, if a change occurs in condition from out of bounds to within bounds thereafter, the user of the change in condition by an informing sound or vibration, and the control means for determining, based on inputs from the opening/closing condition detecting means and the switching means, whether the first and second main bodies are in closed states or not, determining, if the first and second main bodies are in closed states, whether the switching means has been operated or not, investigating a radio wave receiving condition if the switching means is in an operated state, instructing, even if a condition is out of bounds at this time, if a change occurs in condition from out of bounds to within bounds thereafter, the informing means to issue an informing sound or vibration to inform the user of the change in condition, and also instructing the displaying means to display the same. Accordingly, the folded type portable telephone set of the invention is advantageous in that the user carries the portable telephone set in a folded state and, even if out of bounds is displayed on the displaying means by the operation of the switching means, if the user continues to move while carrying the telephone set, when the user enters an area within bounds for communications, the user can be automatically informed of the entry to within bounds by an informing sound or vibration.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, the embodiment of the present invention will be described with reference to the accompanying drawings.

Figure 1:
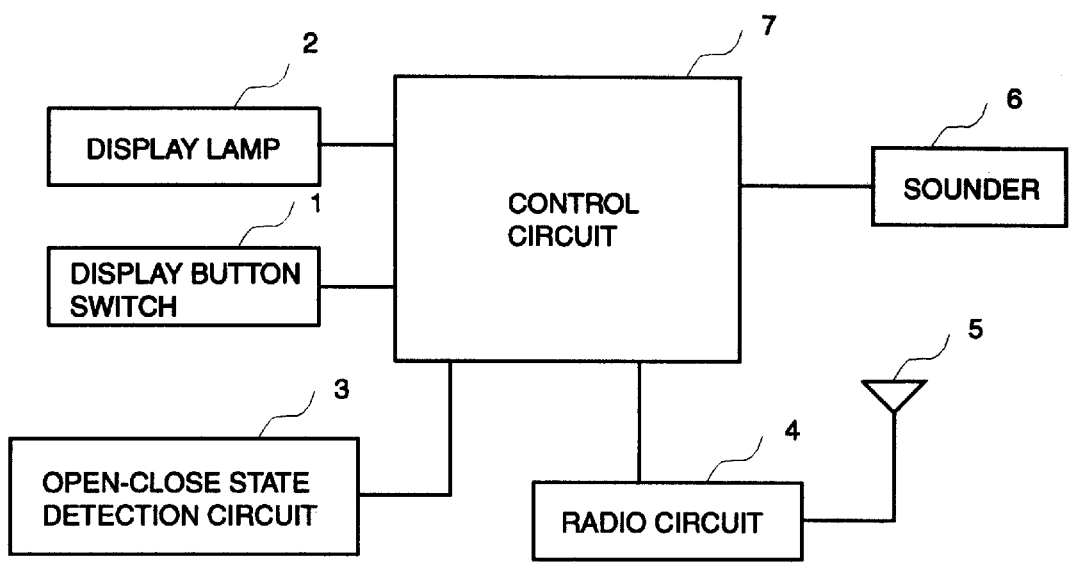
FIG. 1 is a block diagram showing an embodiment of a folded type portable telephone set of the present invention.
Figure 3:
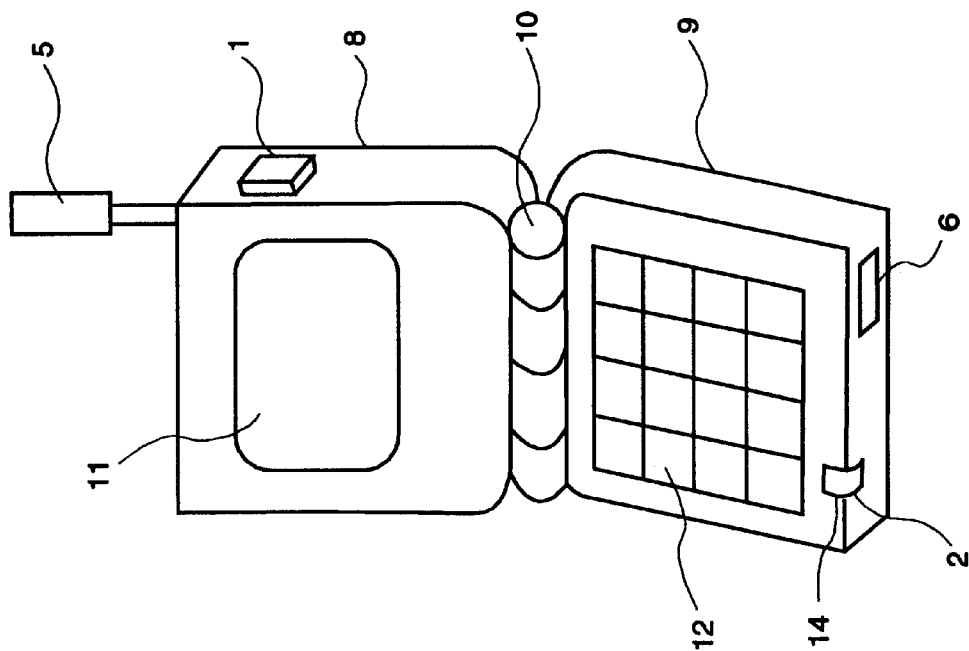
FIG. 3 is showing a folded and closed state of the folded type portable telephone set of showing FIG. 1.
Figure 2:
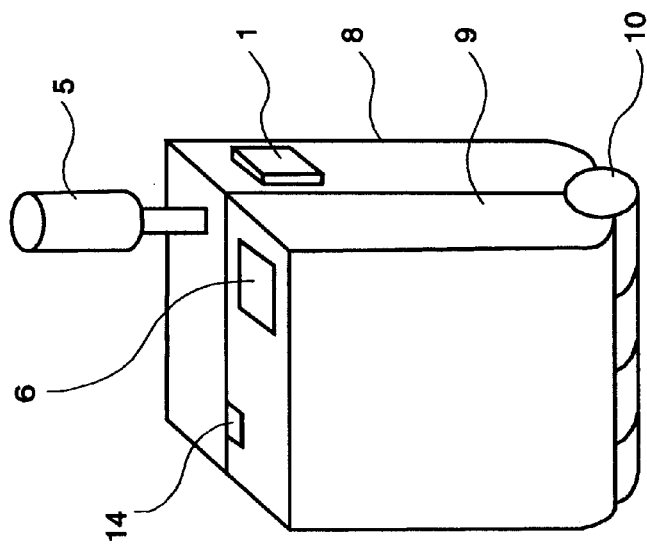
FIG. 2 is showing an opened state of the folded type portable telephone set of showing FIG. 1.

FIG. 1 is a block diagram showing an embodiment of the folded type portable telephone set of the present invention. FIG. 2 and FIG. 3 are appearances mounting layout showing a structure of the folded type portable telephone set of FIG. 1; FIG. 2 showing a folded and closed state and FIG. 3 showing an opened state.

The folded type portable telephone set of the embodiment shown in FIG. 1 comprises a display lamp 2 (displaying means) for visibly displaying "WITHIN BOUNDS" or "OUT OF BOUNDS", a display button switch 1 (switching means) for making effective the WITHIN BOUNDS/OUT OF BOUNDS display function of the display lamp when operated while the folded type portable telephone set is in a folded state, a sounder 6 (informing means) for informing, if the folded type portable telephone set is in out of bounds of a service area for communications when the display button switch 1 is operated while the portable telephone set is in a folded state and then the telephone set is moved to "WITHIN BOUNDS" for communications, a user of the change in condition from out of bounds to "WITHIN BOUNDS" by informing sound, an opening/closing condition detecting circuit 3 (opening/closing condition detecting means) for detecting whether the folded type portable telephone set is in a folded and closed state or in an opened state and outputting the opening/closing condition of the portable telephone set, a control circuit 7 (control means) for controlling the sounder 6 and the display lamp 2 based on inputs from the opening/closing condition detecting circuit 3 and the display button switch 1 and a radio circuit 4 for receiving a radio wave of a control channel via an antenna 5 and outputting to the control circuit 7 information regarding an electric field strength of the radio wave of the control channel.

In appearance, the folded type portable telephone set shown in FIG. 1 comprises, as shown in FIG. 2 and FIG. 3, first and second main bodies 8 and 9 and a connecting section 10 for interconnecting the first and second main bodies to be opened/closed.

The first main body 8 includes a liquid crystal display (display) 11 for displaying various bits of information visibly and the display button switch 1 provided in the side face of the first main body for making effective the WITHIN BOUNDS/OUT OF BOUNDS display function of the display lamp 2 provided in the second main body 9 when operated while the first and second main bodies 8 and 9 are in closed states.

The second main body 9 includes various function button switches (various function switches) 12 including a character/numeral input switch, the display lamp 2 provided in the notched section 14 of the second main body and the sounder 6.

The display lamp 2 is composed of a light emitting diode, normally used for incoming call displaying and positioned in a location for confirming the existence of lighting irrespective of the opening/closing conditions of the first and second main bodies. The lighting of the display lamp 2 is confirmed through the notched section 14 provided in the boundary between the front and side faces of the second main body 9. The display lamp 2 is also used as a display lamp for displaying WITHIN BOUNDS OR OUT OF BOUNDS when the display button switch 1 is operated while the telephone set is in a folded state.

The sounder 6 is normally used for incoming call displaying and provided in a position for hearing the sound of an incoming call irrespective of the opening/closing conditions of the first and second main bodies 8 and 9. The sounder 6 is also used as a sounder for informing, when the telephone set is in OUT OF BOUNDS of a service area, the first and second main bodies 8 and 9 are folded and closed and then a change occurs in condition from "OUT OF BOUNDS" displayed by the display lamp 2 when the display button switch 1 is operated to "WITHIN BOUNDS" because of movement, a user of the change in condition.

The opening/closing detecting circuit 3 can be realized by an art used for detecting an ON/OFF condition of the transmitter-receiver of an automobile telephone set, the art being disclosed in the foregoing JP(A) 163638/1996.

Next, the operation will be described.

Figure 4:
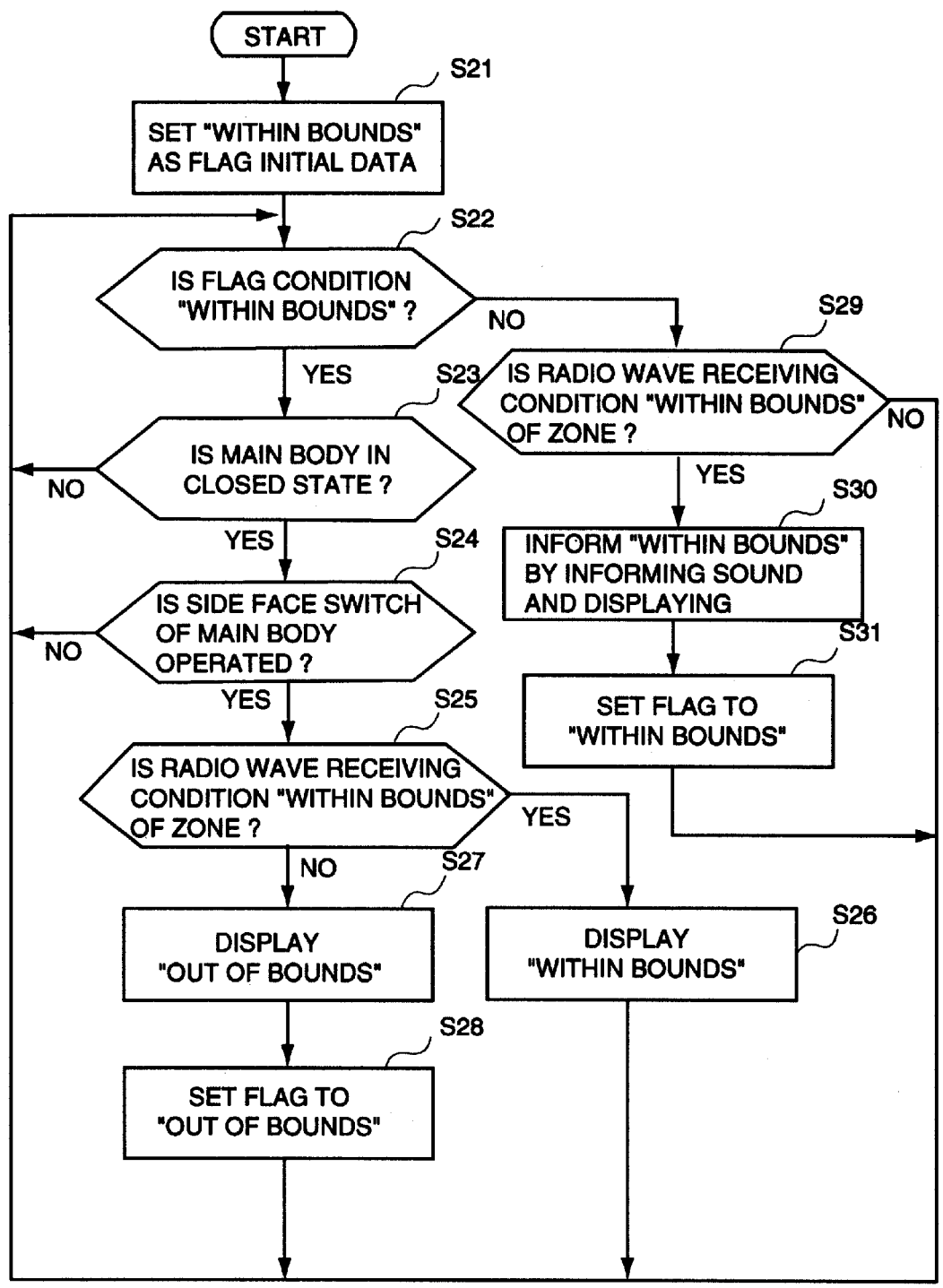
FIG. 4 is a view showing luminance non-uniformity of a discharge tube of the present invention and an amount of a current flowing in a floating capacity.

According to the constitution of the folded type portable telephone set of the present invention, the telephone set is carried in a folded state and, if a user operates, in order to make a call during carrying, the display button switch 1 ON to determine if the present location is in "WITHIN BOUNDS" for communications and the display of the display lamp 2 is "OUT OF BOUNDS", when the user continues to move and enters "WITHIN BOUNDS" for making calls, the user is informed of the entry to "WITHIN BOUNDS" by informing sound. Accordingly, the control circuit 7 included in the folded type portable telephone set of the present invention shown in FIG. 1 performs operations from step 21 (S21) to step 31 (S31) shown in FIG. 4.

First, when power is inputted to the folded type portable telephone set by operating a power button switch included in various function button switches 12, the control circuit 7 starts its operation. A WITHIN BOUNDS/OUT OF BOUNDS index flag value stored in the built-in register of the control circuit 7, which is provided to indicate whether the position of the folded type portable telephone set is "WITHIN BOUNDS" or "OUT OF BOUNDS", is set to a value indicating "WITHIN BOUNDS" as an initial value irrespective of the actual position, "WITHIN BOUNDS" or "OUT OF BOUNDS", of the folded type portable telephone set. For example, if a value of "WITHIN BOUNDS" is "1" and a value of "OUT OF BOUNDS" is n "0", "1" is set as an initial value for the WITHIN BOUNDS/OUT OF BOUNDS index flag in this case (step 21) (flag initial value setting step). Then, the control circuit 7 determines which a value of the WITHIN BOUNDS/OUT OF BOUNDS index flag indicates, "WITHIN BOUNDS" or "OUT OF BOUNDS" (step 22) (flag condition determining step). If "WITHIN BOUNDS" is determined in step 22, the control circuit 7 determines whether the first and second main bodies 8 and 9 are in closed states or not based on a detecting result of the opening/closing condition detecting circuit 3 and returns to the operation of step 22 if the first and second main bodies 8 and 9 are not in closed state (step 23) (opening/closing condition determining step). If the closed states of the first and second main bodies 8 and 9 are determined in step 23, then the control circuit 7 determines whether the display button switch 1 provided in the side face of the first main body 8 is in an operated state or not and returns to the operation of step 22 if the display button switch 1 is not in an operated state (step 24) (switch means operation condition determining step). If a result of determination in step 24 shows the operated condition of the display button switch 1, in other words, if the first and second main bodies 8 and 9 are in closed states and the display button switch 1 is in an operated state, the control circuit 7 investigates, based on information regarding an electric field strength of a radio wave of the control channel received by the radio circuit 4 via the antenna 5, a radio wave receiving condition of the folded type portable telephone set and determines whether the telephone set is in "WITHIN BOUNDS" or "OUT OF BOUNDS" (step 25) (first radio wave receiving condition determining step). If a condition of "WITHIN BOUNDS" is determined in step 25, the control circuit 7 displays the condition of "WITHIN BOUNDS" by the display lamp 2 and returns to the operation of step 22 (step 26) (WITHIN BOUNDS displaying step). For example, if a light emitting diode of two-color lighting is used for the display lamp 2, "WITHIN BOUNDS" can be displayed in green and "OUT OF BOUNDS" can be displayed in red. If a light emitting diode of one-color lighting is used, lighting or flashing may be made corresponsive to each condition display. If "OUT OF BOUNDS" is determined in step 25, the control circuit 7 displays the condition of "OUT OF BOUNDS" (step 27) (OUT OF BOUNDS displaying step). After step 27, the control circuit 7 changes a value of the WITHIN BOUNDS/OUT OF BOUNDS index flag to a value indicating "OUT OF BOUNDS", in other words "0" and returns to the operation of step 22 (step 28) (OUT OF BOUNDS flag setting step). If "OUT OF BOUNDS" is determined in step 22, the control circuit 7 investigates a radio wave receiving condition of the folded type portable telephone set so as to determine a condition of "WITHIN BOUND" or "OUT OF BOUNDS" and returns to the operation of step 22 if a condition of "OUT OF BOUNDS" is determined (step 29) (second radio wave receiving condition determining step). If "OUT OF BOUNDS" is determined in step 29, the control circuit 7 instruct the sounder 6 to inform the user of the change in condition from "OUT OF BOUNDS" to "WITHIN BOUNDS" by informing sound and the display lamp 2 to display the change in condition from "OUT OF BOUNDS" to "WITHIN BOUNDS" (step 30) (WITHIN BOUNDS condition transfer information displaying step). Further, after step 29, the control circuit 7 changes a value of the WITHIN BOUNDS/OUT OF BOUNDS index flag to a value "1" indicating "WITHIN BOUNDS" and returns to the operation of step 22 (step 30) (WITHIN BOUNDS flag setting step).

By the foregoing operations, the display switch is operated while the folded type portable telephone set is in a folded state and, in this case, even if "OUT OF BOUNDS" is displayed, an entry to "WITHIN BOUNDS" is automatically informed to the user during moving.

If "WITHIN BOUNDS" is displayed in the foregoing case, to enter a standby state, it is only necessary to just stay on standby. If a call comes in in a standby state, switching can be made to an incoming call display by stopping the "WITHIN BOUNDS" displaying.

To make a call, a normal call making operation is started. When the folded type portable telephone set is opened from its folded state for making a call, the displaying of "WITHIN BONDS" by the display lamp 2 disappears and then "WITHIN BOUNDS" is displayed on the liquid crystal display 11. By opening the folded type portable telephone set from its folded state, the function of the display lamp 2 returns to an incoming call display function.

As described above, in step 30, the sounder 6 uses informing sound to inform the user. However, if the telephone set is in an environment where the user cannot be informed by the informing sound, the use of the vibrator instead of the sounder 6 enables the user to be informed by vibration.

The entire disclosure of Japanese Patent Application No. 9-170391 filed on Jun. 26, 1997 including specification, claims, drawing and summary are incorporated herein by reference in its entirety.

What is claimed is:

1. A folded-type portable telephone set for informing a user, if a condition of out-of-bounds displayed in a position to be seen while a main body is in a folded state is changed from out-of-bounds to "WITHIN BOUNDS" during moving, said user being informed of said change in condition by one of a sound and a vibration, said telephone set comprising:

switching means for effecting a WITHIN BOUNDS/OUT-OF-BOUNDS display in a position to be seen when operated only while said main body is in a folded state, wherein said switching means effects said one of sound and vibration only while said main body is in a folded state.

2. A folded type portable telephone set comprising:

detecting means for detecting movement from an area of out-of-bounds for disabling calling to an area within bounds for enabling calling; and informing means for informing of said movement to said area of within bounds for enabling calling based on a detecting signal from said detecting means, wherein said informing means informs of said movement only when said folded-type portable telephone set is in a closed position, and wherein said informing means signals said movement to said area of within bounds only when said folded-type portable telephone set is in a closed position.

3. The folded-type portable telephone set of claim 2, wherein said informing means comprises an alarm.

4. The folded-type portable telephone set of claim 2, wherein said informing means comprises a vibrator for informing said user by vibration.

5. A folded type portable telephone set comprising:

a first main body having a display for displaying various bits of information visibly;

a second main body having various function switches including a character/numeral input switch connected to said first main body so as to be opened/closed;

opening/closing condition detecting means for detecting opening/closing conditions of said first and second main bodies;

displaying means for visibly displaying one selected from WITHIN BOUNDS" and out of bounds; switching means for making effective a WITHIN BOUNDS/OUT OF BOUNDS display function of said displaying means when operated while said first and second main bodies are in closed states; and informing means for informing, if a condition is "WITHIN BOUNDS" when said switching means is operated while said first and second main bodies are in closed states and then a condition is changed to within bounds, said change in condition by displaying means other than said displaying means.

6. The folded type portable telephone set of claim 5, wherein said informing means is means for informing a user by an alarm.

7. The folded type portable telephone set of claim 5, wherein said informing means is vibrator means for informing said user by vibration.

8. A folded type portable telephone set comprising:

a first main body having a display for displaying various bits of information visibly; a second main body having various function switches including a character/numeral input switch connected to said first main body so as to be opened/closed;

opening/closing condition detecting means for detecting opening/closing conditions of said first and second main bodies;

displaying means for visibly displaying one selected from within bounds and out of bounds;

switching means provided in a side face of said first main body for making effective a WITHIN BOUNDS/OUT OF BOUNDS display function of said displaying means when operated while said first and second main bodies are in closed states;

informing means for informing, if a condition is out of bounds when said switching means is operated while said first and second main bodies are in closed states and then a condition is changed to within bounds, said change in condition;

flag initial value setting means for setting a WITHIN BOUNDS/OUT OF BOUNDS condition flag value to a value indicating within bounds as an initial value irrespective of which position, within bounds or out of bounds, said folded type portable telephone set actually takes, said condition flag value being used for indicating, immediately after power input, which position said folded type portable telephone set takes, within bounds or out of bounds; flag condition determining means for determining which value, within bounds or out of bounds, said WITHIN BOUNDS/OUT OF BOUNDS condition flag value takes;

determining means for making determination, based on a detecting result of said opening/closing condition detecting means if within bounds is determined in said flag condition determining means, as to whether said first and second main bodies are in closed states or nor and as to whether said switching means is in an operated state or not;

first radio wave receiving condition determining means for determining a within bounds condition, and alternatively an out of bounds condition, by investigating a radio wave receiving condition of said folded type portable telephone set, if results of determination made by said determining means show that said first and second main bodies are in closed states and said switching means is in an operated state;

WITHIN BOUNDS displaying means for displaying, if a condition of within bounds is determined by said first radio wave receiving condition determining means, said condition of within bounds by said displaying means;

OUT OF BOUNDS displaying means for displaying, if a condition of out of bounds is determined by said first radio wave receiving condition determining means, said condition of out of bounds by said displaying means;

means for setting said WITHIN BOUNDS/OUT OF BOUNDS condition flag value to a value indicating out of bounds after displaying of said OUT OF BOUNDS condition;

WITHIN BOUNDS condition transfer informing and displaying means for instructing said informing means to inform, if a condition of within bounds is determined by said second radio wave receiving condition determining means, a user of a change in condition from out of bounds to within bounds and said displaying means to display said change in condition from out of bounds to within bounds; and means for changing setting of said WITHIN BOUNDS/ OUT OF BOUNDS condition flag value to a value indicating a condition of within bounds after said WITHIN BOUNDS condition transfer informing and displaying.

9. Folded type portable telephone set of claim 8, wherein said informing means is means for informing said user by an alarm.

10. The folded type portable telephone set of claim 8, wherein said informing means is vibrator means for informing said user by vibration.

11. The folded type portable telephone set of claim 8, further comprising informing means for instructing, if a call comes in on standby after said WITHIN BOUNDS/OUT OF BOUNDS condition flag value is changed to a value indicating within bounds by said WITHIN BOUNDS flag setting means, to stop displaying of within bounds to display said incoming call and said informing means to said user of the same by second informing sound.

12. An informing control method in a folded type portable telephone set, said folded type portable telephone set including:

opening/closing condition detecting means for detecting opening/closing conditions of first and second main bodies, said first main body having a display for visibly displaying various bits of information and said second main body having various functions switches including a character/numeral input switch connected to said first main body so as to be opened/closed;

displaying means for visibly displaying a condition selected from within bounds and out of bounds;

switching means provided in a side face of said first main body for making effective a WITHIN BOUNDS/OUT OF BOUNDS display function of said displaying means when operated while said first and second main bodies are in closed states;

control means for controlling said display and said displaying means based on inputs from said various functions switches, said opening/closing condition detecting means and said switching means; and informing means for informing, if a condition is out of bounds when said switching means is operated while said first and second main bodies are in closed states and then a condition is changed to within bounds, said change in condition, said informing control method comprising:

a flag initial value setting step of setting a WITHIN BOUNDS/OUT OF BOUNDS condition flag value to a value indicating within bounds as an initial value irrespective of which position, within bounds or out of bounds, said folded type portable telephone set actually takes, said WITHIN BOUNDS/OUT OF BOUNDS condition flag value being used for indicating, immediately after power input, which position said folded type portable telephone set takes, within bounds or out of bounds;

a flag condition determining step of determining which value, within bounds or out of bounds, said WITHIN BOUNDS/OUT OF BOUNDS condition flag takes;

an opening/closing condition and switching means operation condition determining step of making determination, based on a detecting result of said opening/closing condition detecting means if within bounds is determined in said flag condition determining step, as to whether said first and second main bodies are in closed states or not and as to whether said switching means provided in said first main body side face is in an operated state or not, and returning to an operation of said flag condition determining step if said first and second main bodies are not in closed states and alternatively if said switching means is not in an operated state;

a first radio wave receiving condition determining step of determining, if a result of determination made in said opening/closing condition and switching means operation condition determining step shows that said first and second main bodies are in closed states and said switching means is in an operated state, a condition selected from within bounds and out of bounds by investigating a radio wave receiving condition of said folded type portable telephone set;

a within bounds displaying step of displaying, if a condition of within bounds is determined in said first radio wave receiving condition determining step, said condition of within bounds and then returning to an operation of said flag condition determining step;

an OUT OF BOUNDS displaying step of displaying, if a condition of out of bounds is determined in said first radio wave receiving condition determining step, said condition of out of bounds;

an OUT OF BOUNDS flag setting step of changing, after said OUT OF BOUNDS displaying step, a value of said WITHIN BOUNDS/OUT OF BOUNDS" condition flag to a value indicating out of bounds and returning to an operation of said flag condition determining step;

a second radio wave receiving condition determining step of determining, if out of bounds is determined in said flag condition determining step, a condition selected from within bounds and out of bounds by investigating a radio wave receiving condition of said folded type portable telephone set and then returning to an operation of said flag condition determining step if a condition of out of bounds is determined;

a WITHIN BOUNDS condition transfer informing and displaying step of instructing, if within bounds is determined in said second radio wave receiving condition determining step, said informing means to inform a user of a change in condition from out of bounds to within bounds by informing sound and said displaying means to display said change in condition from out of bounds to within bounds; and a WITHIN BOUNDS flag setting step of changing, after said WITHIN BOUNDS condition transfer informing and displaying means, a value of said WITHIN BOUNDS/OUT OF BOUNDS condition flag to a value indicating within bounds and returning to an operation of said flag condition determining step.

13. The informing control method in the folded type portable telephone set of claim 12, wherein said informing means informs said user by alarm sound.

14. The informing control method in the folded type portable telephone set of claim 12, wherein said informing means informs said user by vibration.

15. The informing control method in the folded type portable telephone set of claim 12, further comprising an incoming call informing step of instructing, if a call comes in on standby after a value of said WITHIN BOUNDS/OUT OF BOUNDS condition flag is changed to a value indicating within bounds in said WITHIN BOUNDS flag setting step, said displaying means to stop displaying of within bounds to display said incoming call and said informing means to inform said user of the same by second informing sound.

* * * * *